BEST AVAILABLE COPY

2 Sheets—Sheet 1.

T. J. ROCKWOOD.

Machine for Milling the Knife Edges of Scale Beams.

No. 3,865. Reissued March 1, 1870.

Witnesses:
W. C. Dey.
C. C. Livings.

Inventor:
T. J. Rockwood.
By his atty. J. L. Stetson.

N. PETERS, Photo-Lithographer, Washington, D. C.

BEST AVAILABLE COPY

RE No. 3865

2 Sheets—Sheet 2.

T. J. ROCKWOOD.

Milling Machine.

Patented Aug. 11, 1868

Witnesses:

Inventor:

N. PETERS, PHOTO-LITHOGRAPHER, WASHINGTON, D. C.

BEST AVAILABLE COPY

3865

United States Patent Office.

THOMAS J. ROCKWOOD, OF ST. JOHNSBURY, VERMONT.

*Letters Patent No.* 81,007, *dated August* 11, 1868.

IMPROVED MACHINE FOR MILLING THE KNIFE-EDGES OF SCALES.

The Schedule referred to in these Letters Patent and making part of the same.

TO ALL WHOM IT MAY CONCERN:

Be it known that I, THOMAS J. ROCKWOOD, of St. Johnsbury, in the county of Caledonia, and State of Vermont, have invented a certain new and useful Machine for Finishing the Knife-Edges of Scales; and I do hereby declare that the following is a full and exact description thereof.

My machine finishes the knife-edges after they are permanently secured in their places in the lever, treats the metal with mathematical precision by means of milling-tools, carried on firmly-supported and very delicately-adjustable shafts, and presents the same to the milling-tools in such manner, and with such adjustments, that the knife-edge is not only mathematically placed relatively to the other knife-edges, and is accurately finished in the proper line, but may be made more or less acute at will, and may be operated and adjusted very rapidly, and requires but a moderate degree of skill.

I will proceed to describe what I consider the best means of carrying out my invention, and will afterwards designate the points which I believe to be new therein.

The accompanying drawings form a part of this specification.

Similar letters of reference indicate like parts in all the figures. Tints are employed merely to aid in distinguishing parts, and do not imply difference of metal. The metal of the whole may be iron and steel.

Figure 1:
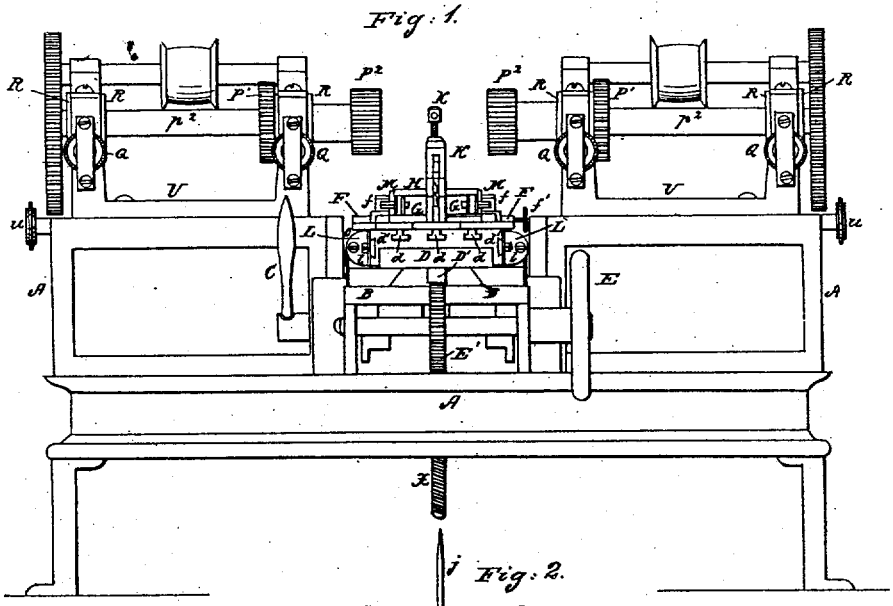
Figure 1 is a front view, with the parts in order for working, and with a lever of a scale in place, but with the milling-tools a little wider apart than the correct position for working, and with the carriage in the middle position.
Figure 2:
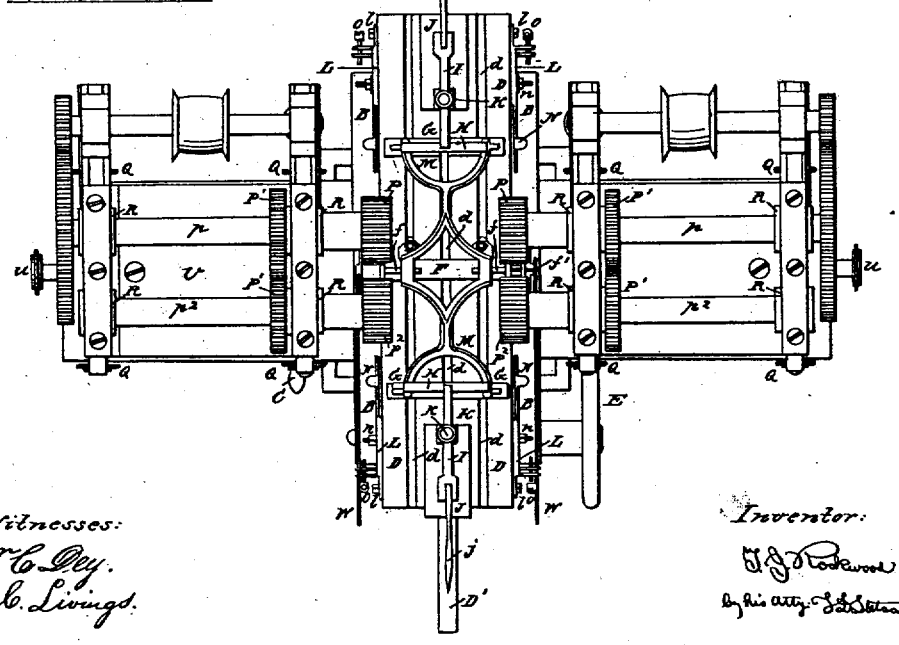
Figure 2 is a plan view of the same.

A A, &c., is the fixed framework of the machine, made of cast iron, and supported on legs, at a convenient elevation.

B is a carriage, adapted to rise and sink between guides. It is capable of no other than a simple vertical motion. It is raised and lowered by means of a lever, C, which may be operated by hand.

D is a table, supported on the carriage B, and capable of traversing longitudinally therein, according as the wheel E is turned. The latter may be turned by hand, as required. The table D carries, firmly fixed on its upper surface, the lever, which has the knife-edges fixed therein. The lever is represented by M.

There are four milling-tools, P $P^2$ $p$ $p^2$, mounted on axes, $p$ $p^2$ $p$ $p^2$, geared together, as represented, and adapted to be slowly and steadily turned by belts, not represented, running on the pulleys which are in gear therewith. The lever being mounted, and firmly clamped in its proper position on the table D, is moved into the right position by turning the hand-wheel E, and is then raised by operating the hand-lever C, to present one side of each of the knife-edges to the corresponding milling-tool. After that side has been properly treated, the lever is lowered by the hand-lever C, and is moved endwise by operating the hand-wheel E, and is then again raised by depressing the lever C, and in this position the opposite sides or faces of the same knife-edges are treated by other milling-tools. Thus it appears that the corresponding knife-edges on the opposite sides of the lever are reduced simultaneously; first, the one side of each is treated, and then the opposite side of each is treated. Holding the lever firmly in the correct position, and having the milling-tools adjusted correctly, the knife-edges are certain to be finished very accurately. An adjustable stop is provided, to prevent the milling-operation from being carried beyond the exactly-right degree in each instance.

Having now given a general idea of the mode of operation, I will explain more in detail the minutiæ of the machine.

First, the adjustments of the milling-tools. It will be observed that the shafts $p$ $p^2$ $p$ $p^2$ are carried in pairs, nearly or exactly in line, and that the pairs are geared together on each side by coarse and long-toothed gear-wheels, $P^4$. This compels the milling-tools P $P^2$, on each side of the machine, to turn towards each other,

BEST AVAILABLE COPY and gives the right motion for finishing each side of the knife-edges with a downward cut. The power is applied through the gearing, as represented, to one set, *p p*, of the shafts alone, and the gear-wheels $P^1$ $P^1$ communicate the power therefrom to the other set, *p* $p^2$. The nature of the gearing allows a considerable variation in the distance apart of the sets of axes. It is, in practice, difficult to produce milling-tools exactly alike in diameter, and it is sometimes difficult to insure an absolutely cylindrical form. In case either milling-tool is a little larger or smaller than is intended, or in case either is slightly conical, I can adjust the position of the axis which carries it so as to compensate for such faults; and to cut the knife-edge with accuracy.

The adjustments now referred to are effected by means of the hand-wheels Q Q, &c., which are fixed on endless screws, not represented, which move the bearings for the shafts *p* $p^2$ according as the screws are turned to the right or to the left. The bearings are in blocks R R, which are fitted in the housing, with liberty to move a little distance toward and from the corresponding bearing of the parallel shaft. By making both ends of each shaft adjustable independently, I can set the shafts exactly parallel when the milling-tools carried thereon are exactly cylindrical, and I can, when the milling-tools are conical, set the shafts a little oblique, to compensate therefor. It will be observed that I have made the shaft which carries the driving-pulley adjustable in position. This allows the gearing of this shaft with the corresponding milling-shaft P to be always perfectly adjusted, however the milling-shaft may change in position.

Aside from the very delicate adjustments above described, the milling-tools may be said to be mounted in pairs, P P and $p^2$ $p^2$, one member of each pair being on one side of the machine, and the other member of that pair being on the other side, but both in line, or very nearly in line, with each other. Now, it is desirable, in the great variety of scales which it is desired to treat on a single machine, to adjust the milling-tools to greater or less widths of levers. I do this by moving the whole of each carriage—the carriages or housings in which the shafts *p* $p^2$ and *p* $p^2$ are carried—bodily to and from each other. The housings are designated U U, and are movable out and in on ways or guides, provided on the framework A, by means of the endless screws *u u*. In preparing the machine to finish a wide lever, we adjust the housings U U wide apart. In adapting the machine to finish a narrower lever, as, for example, a common steel-yard bar, we adjust the housings correspondingly nearer together.

Next, the adjustments of the knife-edges. It will be observed that the upper surface of the table D has three longitudinal grooves of a T-section, adapted to receive the heads of bolts, or analogous-shaped masses, and allow them to be guided and confined therein, and adjusted in various positions lengthwise of the table. I make these grooves, which are designated *d*, confine the adjustable supports and clamps which secure the lever. As the machine is here represented, the central knife-edges are being supported firmly in adjustable supports, which I have not before referred to, and these supports aid in keeping the end knife-edges in the exact position required while they are being milled. The adjustable supports are represented by *f f*. They are traversed longitudinally on the adjustable cross-piece F by means of a screw, *f'*. It will be seen that by these arrangements, the cross-piece F being adjustable longitudinally in the grooves *d d*, and the supports *f f* being each adjustable, independently, in the transverse direction, the knife-edges can be placed at any distance apart, and at any distance from either end of the table. I provide two of these cross-pieces F with adjustable supports, and adjustable screws, although only one is here represented. When it is necessary to finish the central knife-edges of a lever, I support the end knife-edges, at each end, on such supports.

The ends of the knife-edges, which are to be milled, rest firmly upon blocks G G, indicated in red outline, which are carefully finished to such heights that, when the central knife-edges are properly rested in the supports *f f*, the levers bear fairly at the ends on the supports G G. The lever M is pressed down firmly at each end by means of cross-pieces H H, which are operated by levers I I, and cams, J J carried in adjustable stands K K. These stands, being fitted to traverse in the grooves *d d*, may be adjusted longitudinally to any position required on the table D by turning the screw K. The height of the centre of the lever I may be varied at will. When the height of the centre of the lever I is properly adjusted, turning the cam J down or up by means of the handle *j*, independently, slackens or tightens the pressure upon the corresponding cross-piece H.

I have now described the means for holding the lever M, with its several knife-edges, very firmly in its desired position on the table D. I have now to describe the very important provisions for moving the latter with its load.

In order to finish the knife-edges at one end of the lever, the hand-wheel E is seized by the hand and turned. This moves the table D endwise, by reason of the action of the gear-wheel E' on the rack D', the latter being attached to the table D, and compelling the latter to move with it. When the table has been moved to a sufficient extent, the hand-wheel is released, and the lever C is operated to raise the table D and its attachments, and thus to present the knife-edges properly to one of the pairs of cutters. It is obviously important to determine with great accuracy the correct longitudinal position of the bed or table D with its load, and also the height to which it shall rise, with each given style or size of lever.

Now, I determine the correct longitudinal position by means of gauges, which are very delicately adjustable. I use one gauge for the adjustment of the table for finishing the front faces of the knife-edges at the front end of the lever; another gauge for determining the position in finishing the back faces of the front knife-edge; still a third for the front faces of the rear knife-edges, and a fourth for the back faces of the rear knife-edges.

These four gauges are represented near the four corners of the table D. Each is separately adjustable. This fact being distinctly understood, so as to allow the cutting or finishing of each face to be adjusted independently of the others, a minute description of one will suffice for the whole.

A dove-tailed groove extends longitudinally on each edge of the table D. This is represented by *d'*. The gauges are adjustable in these grooves. Confining our attention to one alone of the gauges, L represents a

BEST AVAILABLE COPY

3865 carriage which is adjustable longitudinally along the groove *d'* by means of the pinching-screw *l*; that is to say, on slackening the screw *l*, the small carriage L may be pushed lengthwise of the groove, and adjusted roughly in any desired position, and then firmly confined by tightening the screw *l*. Now the gauge N is mounted, so as to slide longitudinally in the carriage L. It may be confined firmly by means of the screw *n*, or it may be adjusted longitudinally on the carriage L, with all the delicacy that can be desired, by means of the screw O. I prefer to let the screw *n* extend through both the gauge N and the carriage L, and to find its base in a dove-tailed head corresponding in form and size to the dove-tailed groove *d'*. In such case the tightening of the screw *n* not only confines the gauge N relatively to the carriage L, but also confines both firmly relatively to the carriage D, but this may not be material. The carriage, L, being supposed to be itself secured beyond a possibility of springing or yielding appreciably by the screw *l*, it may not be vitally important to attach the gauge N more directly than to the carriage L. In either case the slackening of the screw *n* liberates the gauge N, and allows it to be adjusted by the screw O, after which it can be tightened by tightening the screw *n*.

The gauge N performs its functions as follows: It extends forward beyond the carriage L, and is capable of springing upward a little. Its front edge is bevelled upward, and, as the carriage D, on being carried forward by the action of the hand-wheel E and its connections, approaches the termination of its journey, the bevelled front end of the gauge N touches, and commences to ride upon the fixed knife-edge V, which is mounted on the carriage B.

It should be remarked that this member, though properly called a knife-edge from its form and functions, is not one of the knife-edges to be treated, but is, on the contrary, a part of the machine itself.

The turning of the hand-wheel E being continued, the gauge N slides forward, pressing downward upon the knife-edge V until exactly the right position has been attained, when the fixed knife-edge V is received in a recess of corresponding form produced in the lower face of the springing part of the gauge, and arrests the motion.

Figure 3:
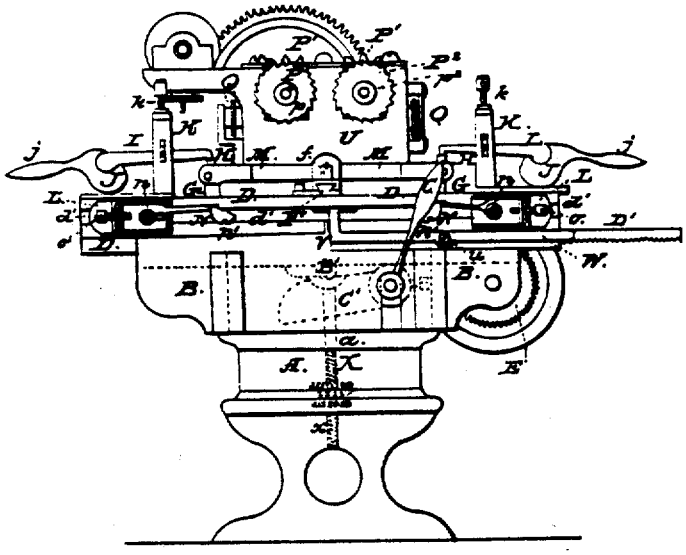
Figure 3 is an end view, with the milling-tools and all the adjacent mechanism removed from this end, to allow a clear view of the central mechanism.
Figure 4:
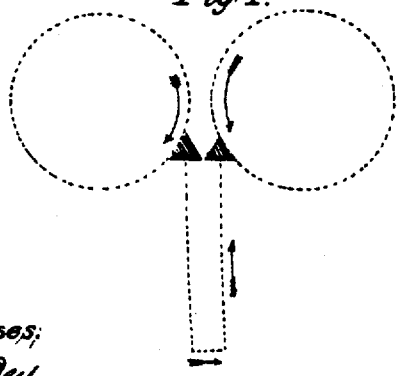
Figure 4 is a diagram illustrating the motion of each knife-edge in being presented for finishing each face.

This recess is plainly shown in fig. 3, and is designated *n'*. It will, of course, be understood that the operator knows approximately when he reaches the proper position of the table D and its load, and that consequently he is not turning the hand-wheel E with very great force at that time.

The gauge N, and its connections, as also the fixed knife-edge V, should be made of sufficient strength to indicate very plainly to the attendant by the clicking down of the gauge N upon the fixed knife-edge V, and the sudden immobility of the parts, that the right position has been attained.

When this condition of the mechanism is attained, the lever C is operated to raise the table D and its load. After the knife-edge has been finished on that face, it is again lowered. The gauge N is elevated from its connection with the fixed knife-edge V by means of the hand-lever W, which turns on the centre *w*. In this condition of the parts, the hand-wheel E may be again turned, and the table D may be moved endwise to the extent required for finishing another face.

The mechanism for raising and lowering and properly gauging the elevation of the table D and its load, will now complete the description of the machine.

The lever C is connected to a pair of cams, or more properly operates a pair of cam-levers C' fixed on the shaft *e*. These levers C' turn with the hand-lever C, and act to lift the carriage B and its connections by acting against rollers B', which are mounted on the under face of the carriage B.

The acting faces or sides of the cam-levers C' are grooved, as represented, so that while in the early part of the ascending motion, the motion shall be rapid, but while in the last part, the motion shall be slower. This slowing of the motion towards the end of the ascent, provides sufficient time for the milling-tools P to cut away the metal slowly. I provide a stop for the upward motion, which is reliable and adjustable. This is a nut, X, which may be turned up and down, as required, on the screw *x*, which depends from the centre of the carriage B. In the lower positions of the carriage B the nut X is of no effect, but on raising it to present a knife-edge to the action of the milling-tools, the nut X approximates to a firm bearing against the surface *a* provided on the framing A, and, when the carriage B and its connections have been raised to a just sufficient extent to insure the reduction of the knife-edges to the proper extent, the nut strikes fairly against the surface *a* and arrests the ascent. The operator instantly feels this resistance, and, after holding the lever C stationary for a few seconds to allow the milling-tools to complete their work perfectly, he returns the lever C to its original position, thus lowering the carriage.

The carriage is now free to be moved for milling another face of the same or a different knife-edge, or to allow the entire lever M to be removed and another substituted, and thus the work may be carried on rapidly and continuously.

Having now fully described my invention, together with the best means known to me for applying it in practice, what I claim as new, and desire to secure by Letters Patent, is not the specific parts mentioned in severalty, but as follows:

1. I claim the combination of the table and holding-device with the four milling-tools P $P^2$ P $P^2$, when all are adjustable as herein set forth.

2. I claim the laterally-adjustable cross-piece F, the knife-edge supports *f*, adjustable to a greater or less distance apart by means of the screws *f'* and the table D, in combination with the milling-tools P $P^2$, all arranged substantially as and for the purposes herein specified.

3. I claim the adjustable vertical stop X and screw-shaft *x*, in combination with the levers C C', carriage B, table D, and the milling-tools P $P^2$, as and for the purposes herein set forth.

4. I claim the gauges N, their holders L, and fixed knife-edges V on the carriage B, and the table D, in combination with the milling-tools, or their equivalents, as and for the purposes herein set forth.

3865

BEST AVAILABLE COPY

5. I claim the arrangement of the milling-tools P $P^2$ P $P^2$, the carriage B, the table D, and the several devices connected therewith, so as to allow the confining of levers of different sizes, and of different proportions and widths, and the ready changing of the levers and of all the several parts, substantially in the manner herein described.

In testimony whereof, I have hereunto set my name in presence of two subscribing witnesses.

THOS. J. ROCKWOOD.

Witnesses:

W. C. DEY,

THOMAS D. STETSON.